(12) United States Patent
Klika et al.

(10) Patent No.: US 8,794,209 B2
(45) Date of Patent: Aug. 5, 2014

(54) ENGINE MOUNTING SYSTEM

(75) Inventors: Daniel L. Klika, Waukesha, WI (US); Stephen J. Lavender, Racine, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 574 days.

(21) Appl. No.: 12/949,639

(22) Filed: Nov. 18, 2010

(65) Prior Publication Data

US 2012/0124955 A1    May 24, 2012

(51) Int. Cl.
  *F02F 7/00*    (2006.01)
(52) U.S. Cl.
  USPC ........................................ 123/195 R; 180/299
(58) Field of Classification Search
  USPC ......... 56/16.7–16.9, 17.1, 17.4, 320.1, 320.2; 74/16; 417/234, 360, 364, 366, 367, 417/373; 123/41.47, 195 H, 195 R, 195 C, 123/198 E, 41.1, 41.72; 134/172; 180/299, 180/311, 312
  See application file for complete search history.

(56) References Cited

U.S. PATENT DOCUMENTS

| | | | |
|---|---|---|---|
| 2,004,849 A | 6/1935 | Bretschger | |
| 2,044,849 A | 6/1936 | Himberger | |
| 2,103,861 A | 12/1937 | Melcher | |
| 2,554,191 A | 5/1951 | Huber | |
| 3,525,001 A | 8/1970 | Erickson | |
| 3,616,867 A * | 11/1971 | Celli | 173/213 |
| 4,054,115 A * | 10/1977 | Habsburg-Lothringen | 123/193.4 |
| 4,086,034 A | 4/1978 | Hokky | |
| 4,140,442 A | 2/1979 | Mulvey | |
| 4,155,333 A | 5/1979 | Maggiorana | |
| 4,198,935 A | 4/1980 | Seibt et al. | |
| 4,480,967 A | 11/1984 | Schulze | |
| 4,583,921 A | 4/1986 | Wolff et al. | |
| 4,643,652 A | 2/1987 | Eberhardt | |
| 4,756,280 A | 7/1988 | Tamba et al. | |
| 5,040,950 A | 8/1991 | Dalquist, III et al. | |
| 5,179,921 A | 1/1993 | Figliuzzi | |
| 5,245,960 A * | 9/1993 | Macier et al. | 123/195 A |
| 5,338,162 A | 8/1994 | Krarup | |
| 5,415,134 A | 5/1995 | Stewart, Jr. | |
| 5,494,414 A | 2/1996 | Steinhart et al. | |
| 5,556,264 A | 9/1996 | Simonette | |
| 5,785,505 A | 7/1998 | Price | |
| 5,975,863 A | 11/1999 | Mazzucato | |
| 5,980,220 A | 11/1999 | Mazzucato et al. | |
| 6,092,998 A | 7/2000 | Dexter et al. | |
| 6,109,221 A | 8/2000 | Higgins et al. | |
| 6,146,222 A | 11/2000 | Murata et al. | |

(Continued)

OTHER PUBLICATIONS

Honda Marine, BF 35A/40A/50A Owner's Manual, 1994, American Honda Motor Co., Inc., 111 pages.

(Continued)

*Primary Examiner* — Robert Pezzuto
(74) *Attorney, Agent, or Firm* — Foley & Lardner LLP

(57) ABSTRACT

An engine mounting system for power equipment includes a tubular frame, an internal combustion engine, and one or more supports for mounting the engine to the tubular frame. The internal combustion engine includes an engine block and a crankcase cover attached to the engine block. The one or more supports are integrally cast with and extend away from at least one of the engine block and the crankcase cover. Additionally, the one or more supports are designed to be mounted to the frame and are contoured to match a portion of a profile of the frame.

20 Claims, 12 Drawing Sheets

(56) References Cited

U.S. PATENT DOCUMENTS

| | | |
|---|---|---|
| 6,270,322 B1 | 8/2001 | Hoyt |
| 6,470,991 B1 * | 10/2002 | Bowman et al. .............. 180/312 |
| 6,886,523 B2 | 5/2005 | Steffes et al. |
| 7,398,755 B1 * | 7/2008 | Zauner et al. ............. 123/195 H |
| 8,202,063 B2 * | 6/2012 | Gilpatrick et al. ............ 417/234 |
| 8,337,172 B2 | 12/2012 | Klika et al. |
| 8,408,882 B2 | 4/2013 | Klika et al. |
| 2006/0102212 A1 | 5/2006 | Leasure et al. |
| 2006/0254539 A1 | 11/2006 | Emmersberger |
| 2011/0081260 A1 | 4/2011 | Klika et al. |
| 2011/0081261 A1 | 4/2011 | Klika et al. |

OTHER PUBLICATIONS

Honda Marine, Flush Kits, 06190-881-860, 06190-ZV1-860, 19270-ZW1-740, 1 page.

* cited by examiner

US 8,794,209 B2

ENGINE MOUNTING SYSTEM

BACKGROUND

The present invention relates generally to tools powered by engines. More specifically, the present invention relates to an engine mounting system for pressure washers, lawn tractors, electric generators, rotary lawn mowers, and other powered tools.

Typically an internal combustion engine used to power a pressure washer, or other powered tool, is mounted along with other components to a support frame. For example, the support frame may also include a hose reel, a spray gun holster, a billboard or console, and a base plate formed from a metal or plastic sheet extending horizontally between beams of the support frame. With the pressure washer, the engine is mounted to a top side of the base plate and a high-pressure water pump is mounted to an underside of the base plate. Both the engine block and the pump head may include mounting flanges and mounting holes for bolting the engine and pump to the base plate. A power takeoff of the engine is then coupled to the water pump through an opening in the base plate. Base plates are also used with portable secondary electric generators or emergency electric generators.

A rotary lawn mower typically includes a deck. The deck is attached to a support frame of the lawn mower and forms a shroud near the base of the lawn mower to shield a blade. The deck typically includes a flat or slightly rounded top side and a skirt or flange that extends downward from the periphery of the top side. An internal combustion engine is mounted to the top side of the deck, while the skirt surrounds the spinning blade. The engine may be mounted via bolts extending through mounting holes formed in mounting flanges that extend from a block of the engine. The mounting flanges and holes may be arranged according to industry standards (e.g., SAE International, Surface Vehicle Recommended Practice, J609b, as revised in July 2003). A lawn tractor or riding lawn mower typically includes an engine mounted to a frame within a hood or housing of the lawn tractor.

SUMMARY

One embodiment of the invention relates to an engine mounting system for power equipment. The engine mounting system includes a tubular frame, an internal combustion engine, and one or more supports for mounting the engine to the tubular frame. The internal combustion engine includes an engine block and a crankcase cover attached to the engine block. The one or more supports are integrally cast with and extend away from at least one of the engine block and the crankcase cover. Additionally, the one or more supports are designed to be mounted to the frame and are contoured to match a portion of a profile of the frame.

Another embodiment of the invention relates to a pressure washer. The pressure washer includes a frame, an internal combustion engine, a water pump, and a support. The frame includes at least one beam. The internal combustion engine includes an engine block having a crankcase formed in the engine block and a crankcase cover. The crankcase surrounds a crankshaft, which powers the water pump. The support is integrally formed with and extends away from the engine bloc. The support includes a flange designed to be mounted on the beam.

Yet another embodiment of the invention relates to a rotary lawn mower. The rotary lawn mower includes an internal combustion engine, a blade, and a deck. The internal combustion engine includes an engine block having a crankcase and a cover. The crankcase surrounds a crankshaft, which powers the blade. The blade spins below the deck during operation of the rotary lawn mower. The deck is integrally formed with the cover.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
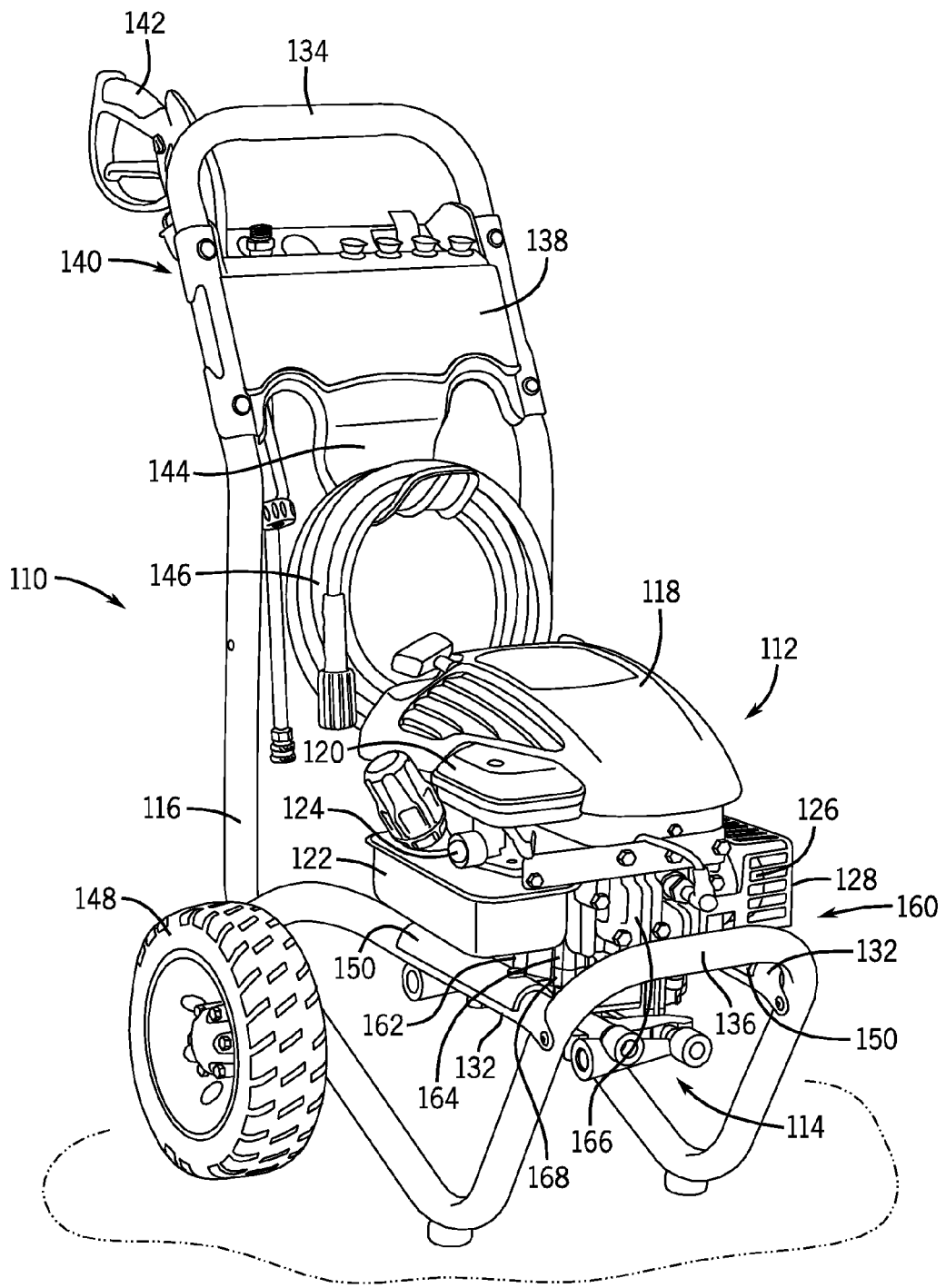
FIG. 1 is a perspective view of a pressure washer according to an exemplary embodiment of the invention.
Figure 2:
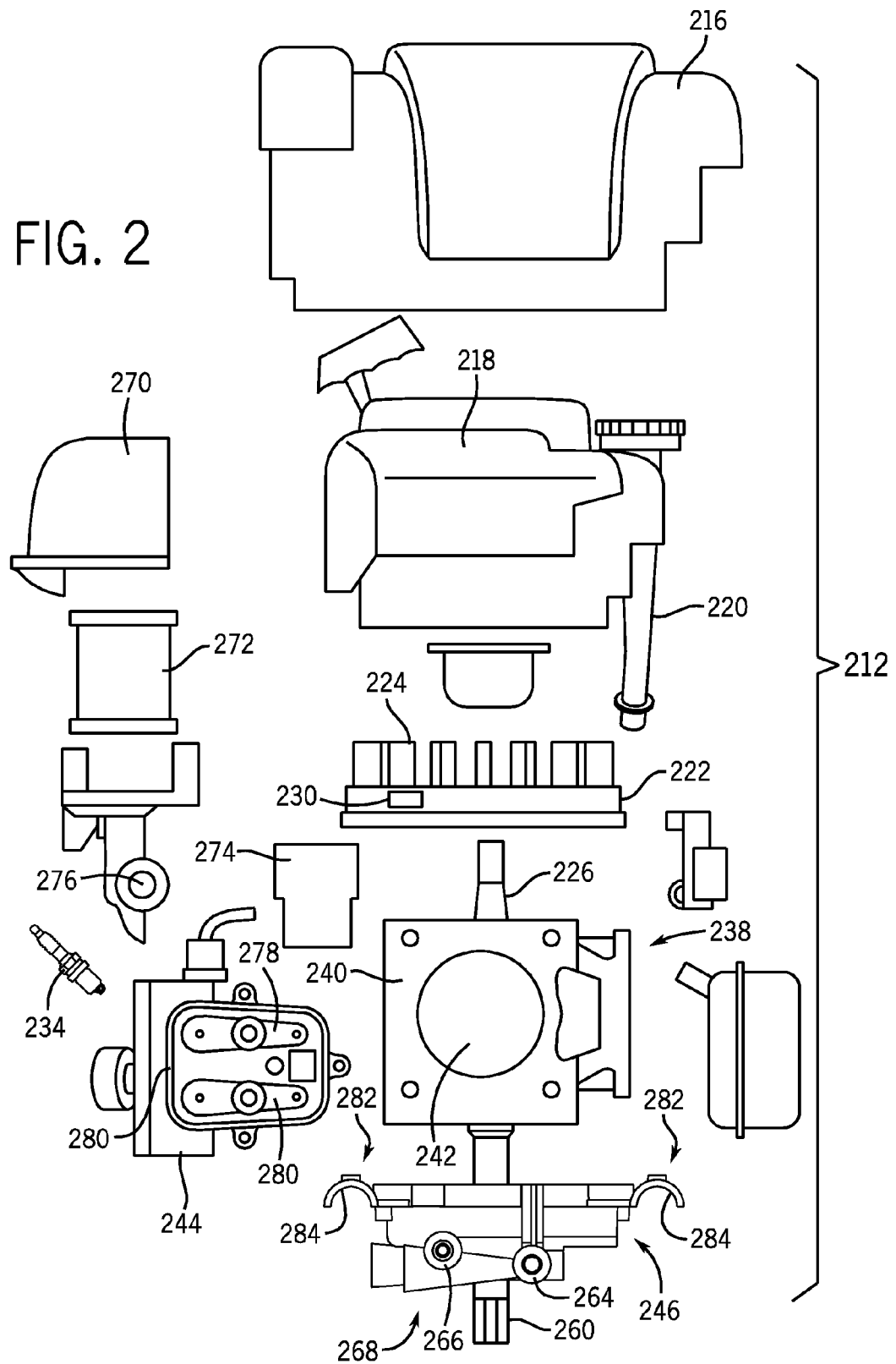
FIG. 2 is an exploded view of an engine system according to an exemplary embodiment of the invention.

Referring to FIG. 1, a pressure washer 110 includes an internal combustion engine 112, a high-pressure water pump 114, and a support frame 116. The engine includes an engine cover 118, an air intake 120, a fuel tank 122, a priming bulb 124, a muffler 126 surrounded by a cage 128, an engine block 160 and other engine components. The engine block 160 includes a crankcase 162, a cylinder 164, a cylinder head 166, and a cover 168 for the crankcase 162 (see also crankcase sump 246 as shown in FIG. 2). In some embodiments, the cover 168 for the crankcase 162 is or includes a sump for pooling lubricant (e.g., oil) within the crankcase 162. An engine mounting structure, formed from attachment supports 150 (e.g., saddles, wings, sleeves, etc.) extends from the engine block 160. The attachment supports 150 include a geometry configured to be coupled to the frame, such as a bend having a concave curvature, an arc, a curved flange, a hook, etc., where the curvature is shaped to match a profile of the support frame 116.

According to an exemplary embodiment, the engine 112 is a four cycle (i.e., four piston strokes per cycle), vertically shafted, gasoline fueled, single-cylinder small engine of a portable size and weight, and with a power sufficient to drive the high-pressure water pump 114. In some embodiments, the engine 112 is configured to provide 3 to 10 foot-pounds (ft-lb) of torque at an engine speed of 3060 revolutions per minute (rpm). In some embodiments, the engine 112 is configured to provide 3 to 50 horsepower (HP). In other contemplated embodiments, the engine 112 may be a two-stroke engine, or may be horizontally shafted, or may have more than one cylinder, or may be diesel powered, or may be otherwise configured.

The engine 112 and the pump 114 are mounted on beams 132 of the support frame 116, not a base plate. According to an exemplary embodiment, the beams 132 are tubular with round cross-sections. The attachment supports 150 of the engine 112 are positioned on the beams 132 (e.g., saddled over the beams 132) and are bolted or otherwise fastened to the frame 116. In other embodiments, beams of the support frame 116 have square, rectangular, or other shaped cross-sections. In still other contemplated embodiments, the support frame 116 is formed from elongate members that are not beams, such as an integration of plates bolted together or an integral, die-cast frame.

Figure 6:
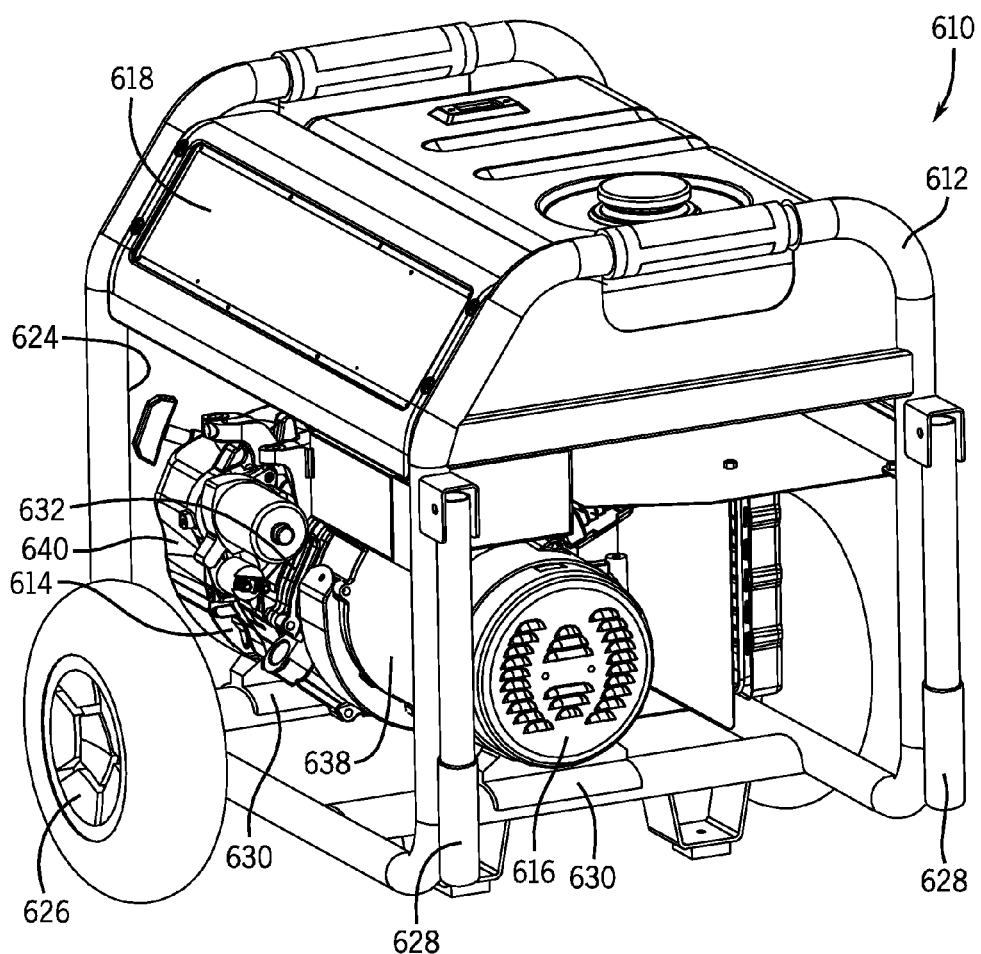
FIG. 6 is a perspective view of a portable generator according to an exemplary embodiment of the invention.
Figure 7:
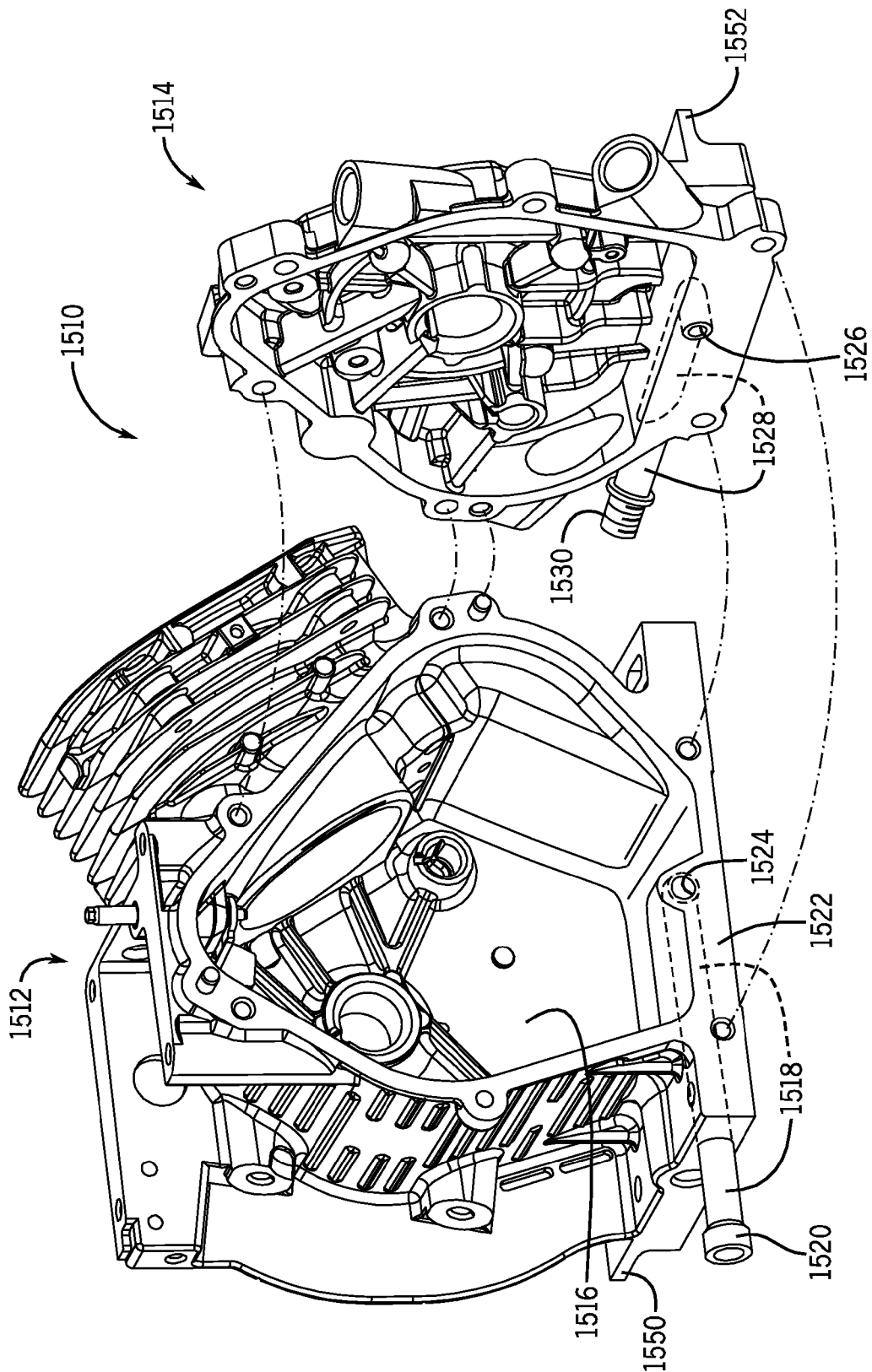
FIG. 7 is a perspective view of an engine according to an exemplary embodiment of the invention.

The support frame 116 additionally includes a handle 134, a front member 136, a billboard 138, a holster 140 for a pressure washer spray gun 142, a rack 144 for a high-pressure hose 146, two wheels 148, and other features. In some embodiments, the support frame 116 includes casters, a protective housing or framework surrounding the engine 112, a drive system for powering the wheels 148, and other features. Features of the support frame 116 may vary as a function of the particular powered tool application (for example, compare electric generator system 610 as shown in FIG. 6 with lawn tractor 710 as shown in FIG. 7).

The high-pressure water pump 114 may be a positive displacement pump, such as an axial cam pump, a duplex water pump with two pistons or plungers, a triplex water pump, a radial pump, or another type of positive displacement pump according to various embodiments. In operation, a high-pressure water stream is generated by the pump 114 and exits the pressure washer 110 through the spray gun 142, or another form of sprayer. In some embodiments the pressure washer system is configured to generate a water stream having an exit pressure exceeding 1000 psi, preferably exceeding 2000 psi. In other embodiments, the water pump 114 is not a positive displacement pump—for example, in at least one embodiment, the pump 114 is a centrifugal water pump for a garden hose booster system.

Referring to FIG. 2, an internal combustion engine 212 may be used with the pressure washer 110, or with other powered tools. The engine 212 includes a shroud 216 (see also engine cover 118 as shown in FIG. 1) mounted over a blower housing 218 and an oil fill tube 220. Beneath the blower housing 218, the engine 212 includes a flywheel 222 with blower fan blades 224 extending from the flywheel 222. During operation of the engine 212, a crankshaft 226 rotates the flywheel 222, which stores rotational inertia and, via the blower fan blades 224, also generates an air flow to cool the engine 212.

The combustion engine 212 further includes a fuel system having an air intake cover 270 and a cleaning element 272 (e.g., filter). The fuel system also includes a carburetor 274 and a primer bulb 276 to add fuel (e.g., gasoline, ethanol, etc.) to the air, creating a fuel and air mixture. The fuel and air mixture is then directed to a combustion chamber, past an intake valve 278. An ignition armature (not shown) is mounted proximate to the flywheel 222 so that magnets 230 within the flywheel 222 pass the ignition armature at specifically timed intervals, generating a high-voltage charge once per rotation of the flywheel 222. The charge is directed to a spark plug 234, which sparks to ignite the fuel and air mixture in a combustion chamber of the engine 212. After ignition, the spent fuel and air is released from the combustion chamber, past an exhaust valve 280.

Still referring to FIG. 2, the crankshaft 226 extends within a crankcase or other chamber formed in a block 238 of the engine 212. A cylinder 240 extends from a side of the block 238, through which a piston 242 translates. A cylinder head 244 is mounted to an end of the cylinder 240, enclosing the combustion chamber. During operation of the engine 212, the piston 242 is driven by the timed ignitions of the fuel and air mixture in the combustion chamber, initiated by the spark plug 234.

A cover for the engine block 238 (e.g., crankcase), shown as, but not limited to, a crankcase sump 246 is attached to the bottom of the engine block 238. According to an exemplary embodiment, oil (or other lubricant) forms a pool in the sump 246 and may then be spread throughout the engine block 238 by a dipper, a slinger, or some other distribution device, which may be powered by the crankshaft 226. In other embodiments, such as those including horizontal engines (i.e., having a horizontal crankshaft), a cover for the respective engine block is attached to a side of a crankcase or engine block. In such embodiments, oil (or other lubricant) pools in a portion of the engine block, or within both the engine block and the cover.

Referring again to FIG. 2, the sump 246 includes mounting supports 282 (e.g., mounting elements, attachment pieces, connecting structures, coupling extensions, etc.) extending away from opposite sides of the sump 246. The supports 282 are configured to mount the engine 212 onto a tubular support frame (see, e.g., support frame 116 as shown in FIG. 1). According to an exemplary embodiment, the supports 282 include an arcuate-shaped member 284 (e.g. a saddle, sleeve), designed to fit over a top of a correspondingly round beam (see, e.g., beams of the support frame 116 as shown in FIG. 1) of a support frame, distributing weight of the engine 212 around the beam.

While shown in FIG. 2 as only extending from two sides of the sump 246, in other embodiments the supports 282 may extend from a front or back of the sump 246, or from three or more sides of the sump. In still other embodiment, the supports 282 may include a member (e.g. saddle) formed with an open square, triangle, oval or other shape. The supports 282 may include holes for bolting the supports 282 to the support frame.

According to an exemplary embodiment, the sump 246 of the engine 212 is integrally formed with plumbing of a water pump for a pressure washer (see, e.g., pressure washer 110 as shown in FIG. 1). The underside 268 of the sump 246 forms a top of the pump housing. The crankshaft 226 passes through an opening in sump 246 to drive the pump. In some embodiments, fluid passages, such as inlet and outlet conduits 264, 266 of the pump, extend within and through the sump 246. In certain embodiments, the inlet and outlet conduits 264, 266 are integrally formed with and extend away from the sump 246 providing an elevated access point of the pump that may be a convenient location for a user of the pressure washer.

Plumbing (pipes, tubes, manifolds, etc.) within the water pump may be adjusted as necessary to match the plumbing of the sump 246, and visa versa. When the water pump is mounted to the sump 246, plumbing in the pump may be connected through apertures in the inlet and outlet conduits 264, 266. The connection between the pump 214 and the inlet and outlet conduits 264, 266 may be fitted with rubber seals, liquid sealant, compression sealed, or otherwise sealed. In other embodiments, the sump 246 includes only the inlet conduit 264—not the outlet conduit 266 (or visa versa), which is separated from the sump 246.

Water used by the pressure washer may flow from a source (e.g., faucet, tap, bibcock, spigot, etc.) that is not typically heated, providing the water at temperatures ranging between 40-80 degrees Fahrenheit (F). Conversely, lubricant (e.g., motor oil) in the engine 212 is heated during engine operation as heat is transferred from components of the engine (e.g., piston, cylinder, etc.) to the lubricant, which may reach temperatures exceeding 200° F. As such, the water passing through the plumbing of the pump (e.g., inlet and outlet conduits 264, 266) is generally cooler than the lubricant in the sump 246, during engine operation. The temperature differential and structure of the sump 246 may facilitate heat transfer from the engine oil through the conduits 264, 266 and into the water flowing through the pump. Accordingly the lubricant is cooled, which may reduce engine running temperatures, improve engine efficiency, and reduce heat-related engine wear.

Figure 3:
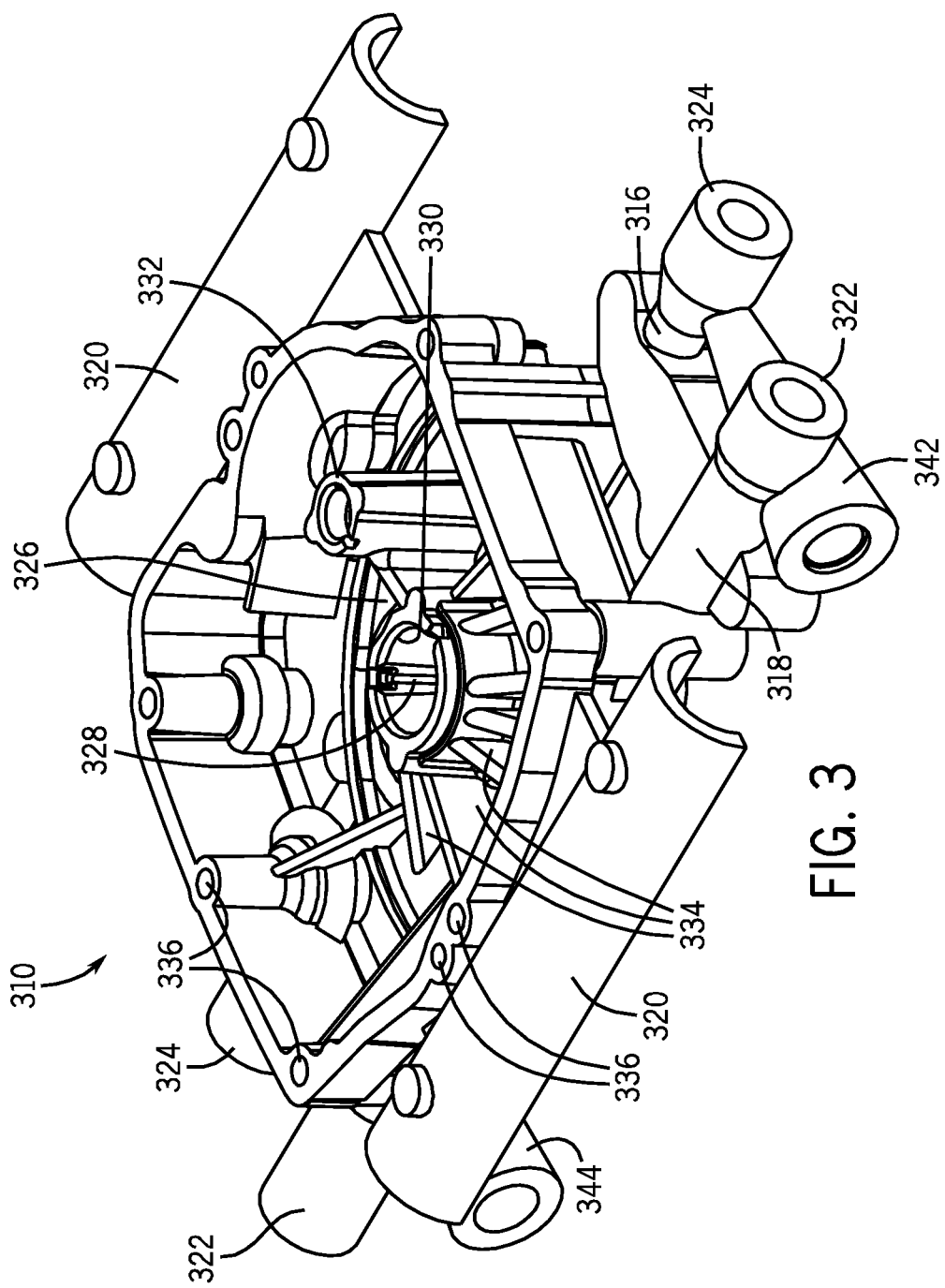
FIG. 3 is a perspective view of a crankcase cover according to an exemplary embodiment of the invention.
Figure 4:
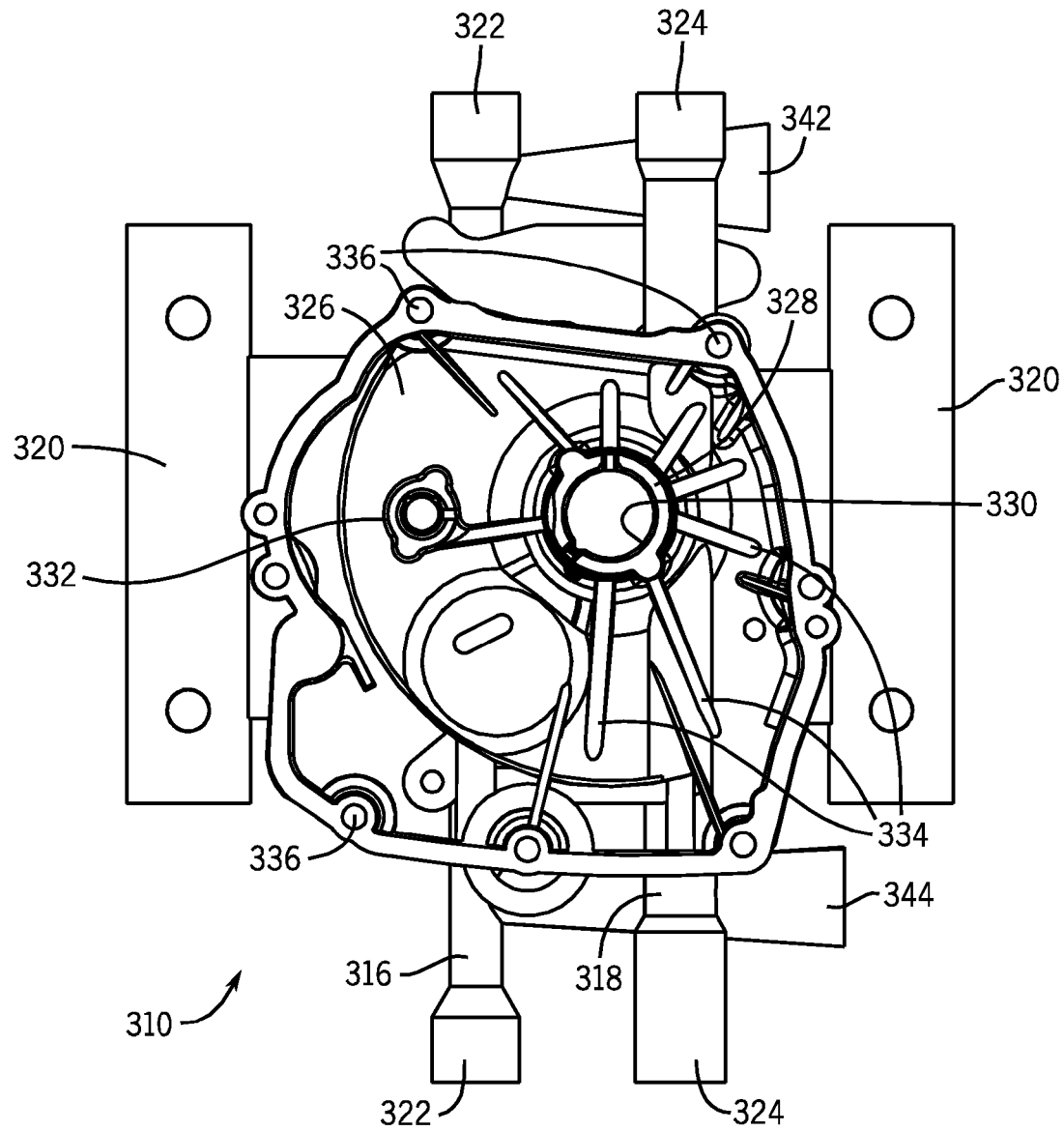
FIG. 4 is a top view of the cover of FIG. 3.
Figure 5:
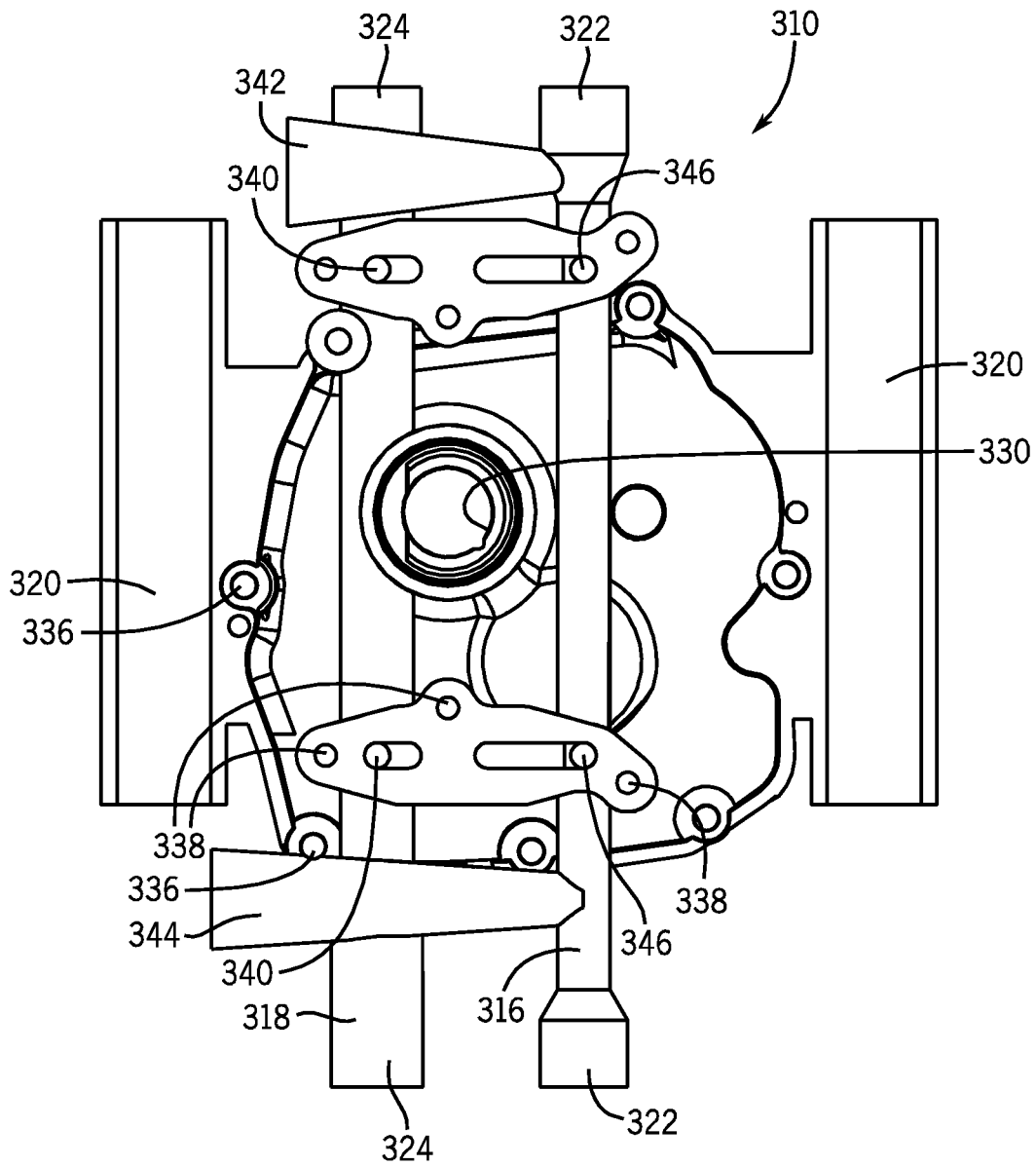
FIG. 5 is a bottom view of the cover of FIG. 3.

Referring now to FIGS. 3-5, a cover for an engine block in the form of a sump 310 of the engine block (e.g., engine block 238 as shown in FIG. 2) includes attachment supports 320, and fluid passages, such as an inlet conduit 316 (e.g., pipe, channel, aperture, port) and an outlet conduit 318. The sump 310 may be formed from discrete parts or a continuous, solid material, such as aluminum, steel, cast iron, ceramic, composite, or other materials. According to an exemplary embodiment, the sump 310 is integrally formed (e.g., a single, continuous, unitary body), such as by casting, molding, welding, or other forming methods. In another embodiment, the sump 310 is formed from components that are not integral, but are fastened together, such as a top of a pump housing bolted to a base of a crankcase forming a combined body.

Referring to FIGS. 3-4, the sump 310 includes an oil basin 326 (e.g., well) and a bearing 328 for a crankshaft surrounding an opening 330 for a power takeoff of the crankshaft (e.g., crankshaft 226 and power takeoff 260 as shown in FIG. 2). The sump 310 also includes a bearing 332 for a camshaft, reinforcement structure 334, mounting holes 336 for fastening the sump 310 to an upper portion of the engine block (e.g., engine block 238 as shown in FIG. 2), and other features. In some embodiments, the bearing 328 is a bushing with a seal or a gasket to prevent oil from leaking through the opening 330. In other embodiments, the bearing 328 is a rolling-element bearing (e.g., ball bearing) or another form of friction-reducing support that allows for free rotation of the crankshaft. According to an exemplary embodiment, the oil basin 326 is a recessed area such that oil or other lubricant collects and then is distributed throughout the engine block (e.g., crankcase) during engine operation. The mounting holes 336 facilitate bolting of the sump 310 to an upper portion of the engine block.

Referring now to FIG. 5, the sump 310 is configured to be fastened to a pump housing. The sump 310 includes the opening 330 for the power take-off, which drives a pumping mechanism, such as a wobble plate and pistons for an axial cam pump, a cam and pistons for a triplex pump, an impeller for a centrifugal pump, etc. The sump 310 further includes apertures 338 for fastening the pump housing to the sump 310, and openings 340, 346 in the inlet and outlet conduits 316, 318 that allow the water to and from the pumping mechanism.

According to an exemplary embodiment, the inlet conduit 316 includes a coupling 322 (i.e., hose connector), such as male or female quick-connect coupling or a threaded coupling for a garden hose (e.g., a standard ¾-inch hose, or other size hoses). The outlet conduit 318 includes a coupling 324 for a high-pressure water hose (e.g., hose 146 as shown in FIG. 1). Additionally, in some embodiments, the outlet conduit 318 has a greater wall thickness than the inlet conduit 316 because water passing through the inlet conduit 316 may be at a significantly lower pressure (e.g., 40-60 psi) than the water passing through the outlet conduit 318 (e.g., between 1000 to 3000 psi, or more). In such embodiments, the inlet and outlet conduits 316, 318 are further coupled to a starter valve 342 and an unloader valve 344.

Similar to the sump 246, the sump 310 as shown in FIGS. 3-5 includes the attachment supports 320 including half-cylindrical saddles sized to fit over corresponding tubular beams (e.g., rails) on a support frame (e.g., support frame 116 as shown in FIG. 1). The attachment supports 320 may be bolted, welded, glued, or otherwise fastened to the support frame. While the sumps 246, 310 of FIGS. 2-5 include pressure washer plumbing integrated therewith, in other embodiments a sump does not include plumbing for a pressure washer pump. Instead the sump is used with an engine block attached to a walk-behind rotary lawn mower, a lawn tractor, a portable electric generator, a log splitter, a garden tiller, a chipper, a blower, an edger, an air compressor, a snow thrower, and a water pump (see, e.g., powered tools of FIGS. 6, 9, and 13).

Referring now to FIG. 6, a portable electric generator 610 may be wheeled to a desired outdoor location to provide back-up or emergency power for a home or business. The generator 610 includes a support frame 612, an internal combustion engine 614, an alternator 616, and a fuel tank 618. Attached to the support frame 612, a billboard 620 or control console may include an on/off switch and other controls. When the generator 610 is operating, fuel from the fuel tank 618 powers the combustion engine 614, which drives the alternator 616, which generates electricity.

The support frame 612 of the generator 610 includes a network of tubular members (e.g., beams) welded, bolted, or otherwise fastened together. In some embodiments, the tubular members of the support frame 612 are positioned around an inner volume 624 of the generator 610. The engine 614 and the alternator 616 are fastened to the support frame 612 substantially within the inner volume 624. The fuel tank 618 is attached to the support frame 612 above the engine 614 and the alternator 616. Wheels 626 are coupled to the support frame 612, which also includes extendable handles 628. The tubular members of the support frame 612 may additionally serve as bumpers, protecting the engine 614 and the alternator 616.

The engine 614 is mounted to the support frame 612 via mounting supports 630 extending from a block 632 of the engine 614. According to an exemplary embodiment, the engine block 632 is integrally cast with the mounting supports 630, which are designed to facilitate attachment of the engine 612 to the support frame 614. The supports 630 may include rails or sleeves with through-mounting holes, designed to allow for bolting of the engine 614 to beams of the support frame 612. In other embodiments, the mounting supports 630 extend longitudinally with the engine block 632. In some such embodiments, integrally casting the mounting supports 630 with the engine block 632 as a single, unitary, continuous body is intended to prevent relative vibrations between separate parts, reducing system noise, wear, and fatigue. Further, such integral casting may reduce manufacturing time associated with assembly.

In some contemplated embodiments, the engine 614 includes a support rail that is integrally formed with a cover 640 of the engine block 632 (see, e.g., FIGS. 3-5 and 7-8). In some embodiments the alternator 616 includes mounting supports integrally formed with a housing 638 of the alternator 616. Integrally forming the mounting supports with the engine block 632, the cover 640, or the housing 638 of the alternator 616, reduces the number of mounting components, which may improve vibration characteristics of the generator system 610, reducing noise and wearing of components.

Figure 8:
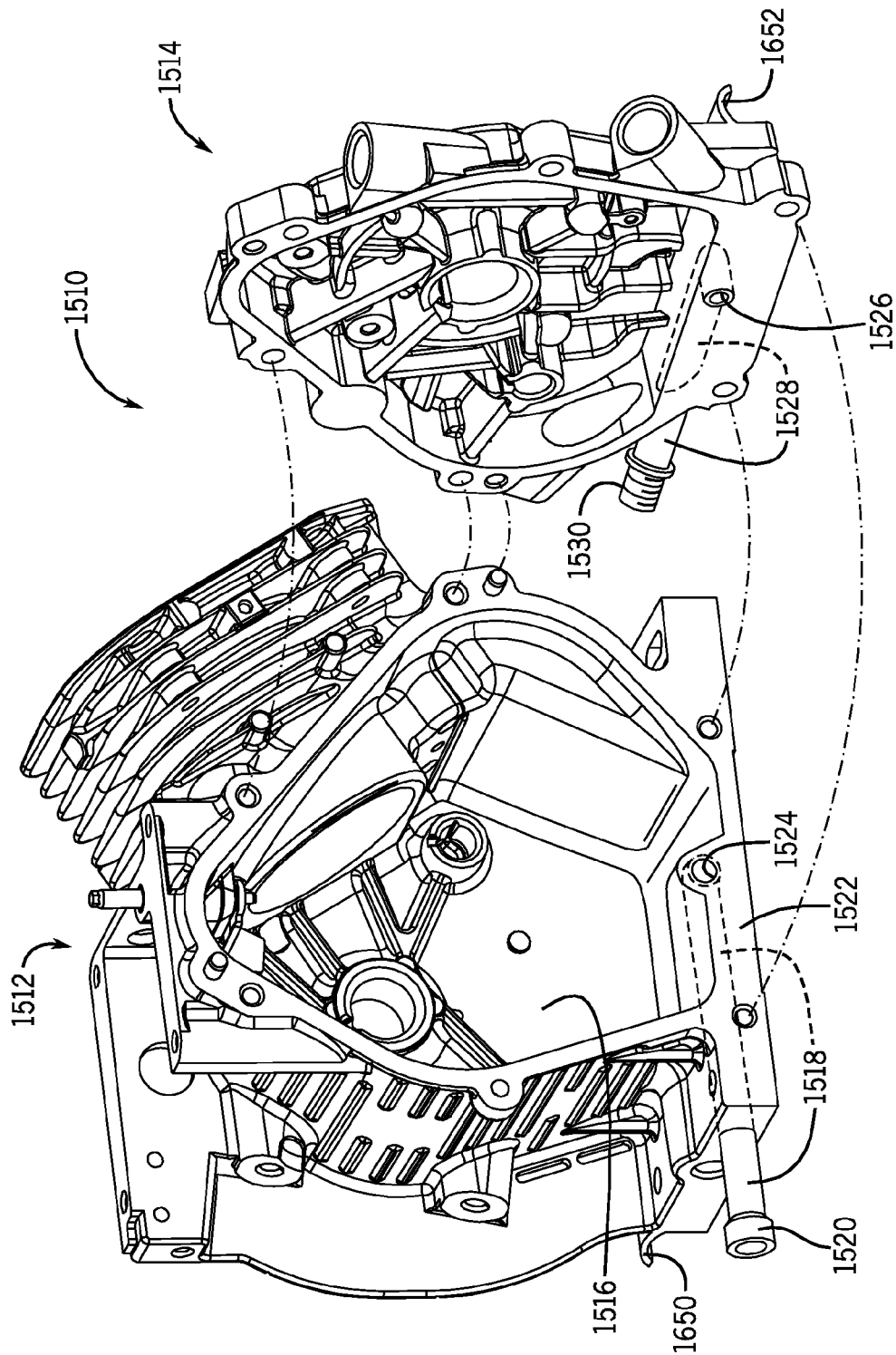
FIG. 8 is a perspective view of an engine according to another exemplary embodiment of the invention.

Referring to FIGS. 7-8, a horizontally-shafted internal combustion engine 1510 includes an engine block 1512 and a cover 1514 therefor. Within the engine block 1512, a volume 1516 (e.g., crankcase) is configured to contain working elements of the engine 1510, such as a crankshaft, a camshaft, a dipper, and other such components.

The engine block 1512 further includes a conduit 1518 extending through one or more walls 1522 thereof. The conduit 1518 includes an inlet 1520 coupled to at least one of the engine block 1512 and the cover 1514, and an outlet 1530 also coupled to at least one of the engine block 1512 and the cover 1514. According to an exemplary embodiment, the conduit 1518 extends through the wall 1522 of the engine block 1512 to an intermediate outlet 1524. When the cover 1514 is mounted to the engine block 1512, the intermediate outlet 1524 is connected to an intermediate inlet 1526, which directs the flow through the cover to the outlet 1530.

In FIGS. 7-8, both embodiments of the engine 1510 include mounting supports 1550, 1552, and 1650, 1652. According to an exemplary embodiment, the mounting supports are integrally cast with the respective engine block 1512 and cover 1514. Referring to FIG. 7, the mounting support 1550 includes a straight projection extending away from the wall 1522 of the engine block, and the mounting support 1552 includes a straight projection extending away from the cover 1514, on a portion thereof opposite to the mounting support 1550 about the vertical axis. Likewise, the mounting supports 1650, 1652 of FIG. 8 extend from the wall 1522 of the engine block 1512 and the cover 1514, however the mounting supports 1650, 1652 are contoured to match curvature of round tubular support beams of a frame of power equipment. The mounting supports 1550, 1552, 1650, 1652 may be bolted, welded, glued, riveted, or otherwise fastened to corresponding support structure (e.g., beams, support frame) of power equipment for which the engine 1510 may drive a powered tool.

Figure 9:
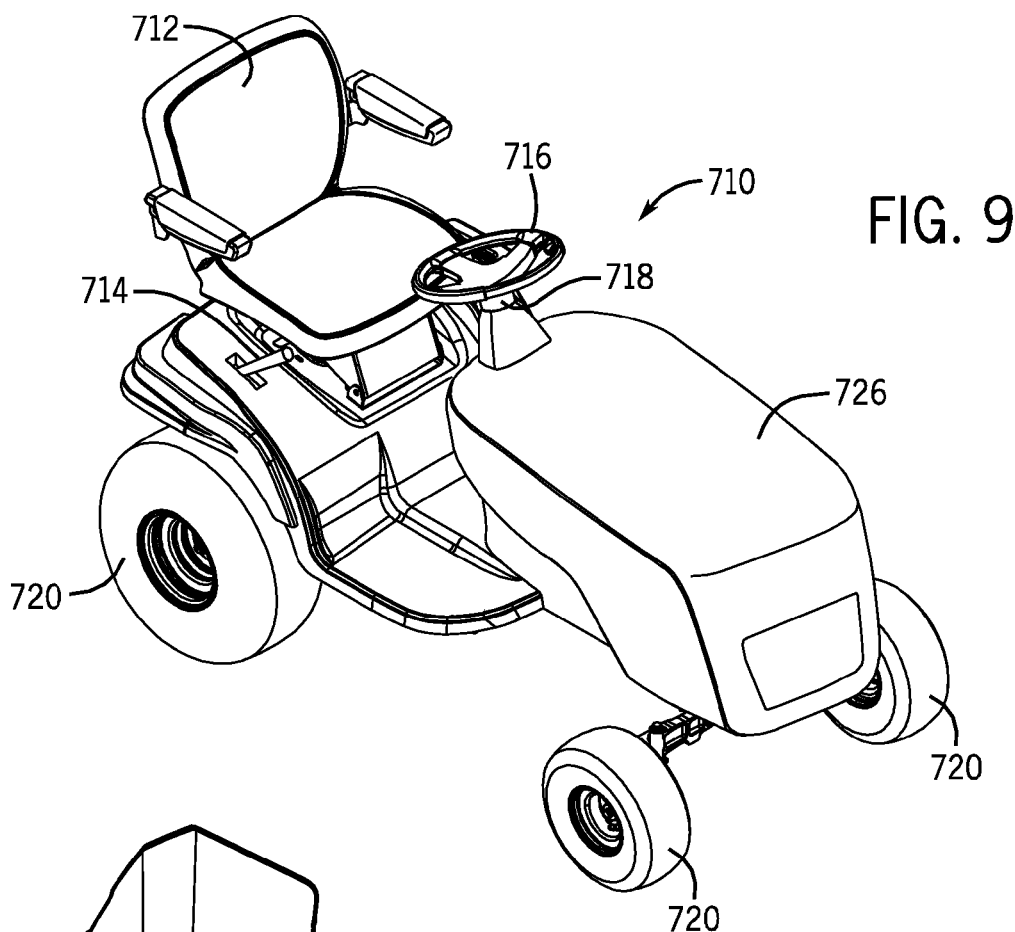
FIG. 9 is a perspective view of a lawn tractor according to an exemplary embodiment of the invention.
Figure 10:
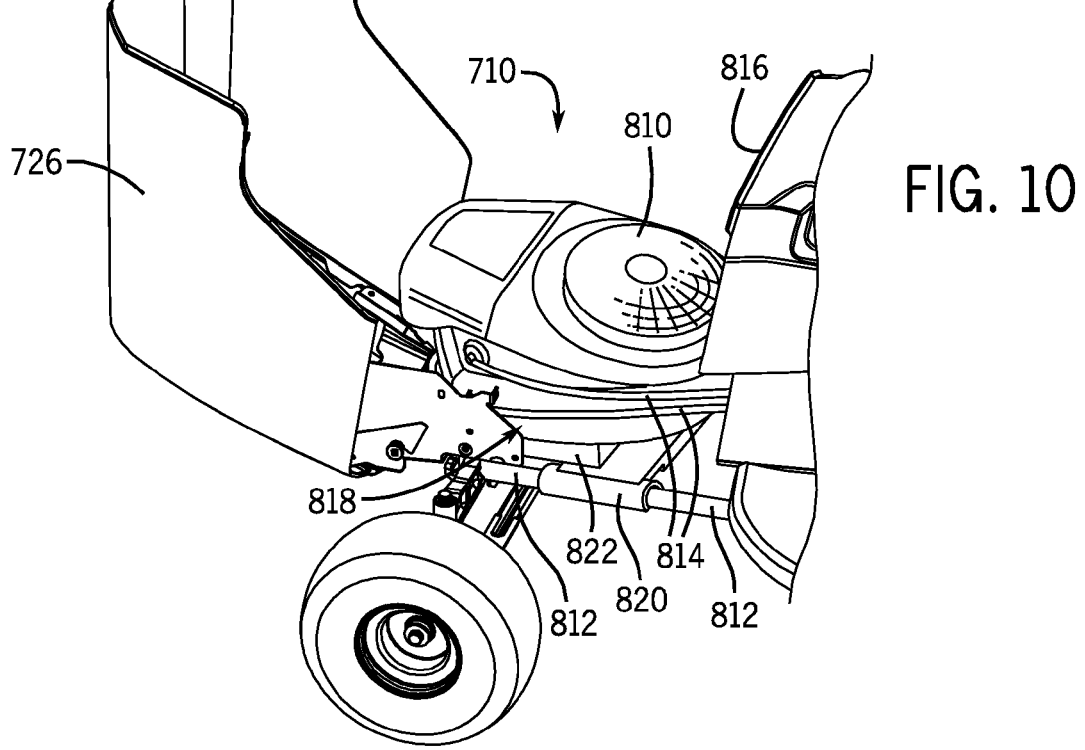
FIG. 10 is a perspective view of an engine for the lawn tractor of FIG. 9.

Referring now to FIGS. 9-10, a lawn tractor 710 (e.g., riding lawn mower) includes a seat 712, a gear shift 714 (e.g., stick), a steering wheel 716 (and a column 718), and wheels 720. In some embodiments the lawn tractor further includes a deck surrounding blades and forming a cutting chamber. A chute may extend from the cutting chamber of the deck, and may be coupled to a bag for storing cut grass clippings. Alternatively, the chute may direct the clippings from the side of the lawn tractor 710. In other embodiments, the lawn tractor 710 is a gang reel mower or a gang lawn mower, pulling a configuration of reels or decks.

The lawn tractor 710 of FIG. 9 further includes a hood 726 for housing internal components of the lawn tractor 710. The hood 726 may be raised to allow access to the components and then lowered during operation of the lawn tractor 710. Under the hood 726, the lawn tractor 710 includes an internal combustion engine 810 (see FIG. 10) mounted to a support frame 812 of the lawn tractor 710. The engine 810 is coupled to both a lawn mower blade (or blades) and a drive train of the lawn tractor 710. Control linkages, such as Bowden cables 814, may link a throttle lever and ignition switch operated by a user to control the engine 810. The lawn tractor 710 may further include other components under the hood 726, such as a heat shield 816, an adjustable transmission, a suspension system, and other tractor components. In some embodiments, the lawn tractor 710 further includes an alternator powered by the engine 810 and/or a battery, which supplies electricity to components of the lawn tractor 710 (e.g., lights).

According to an exemplary embodiment, the engine 810 includes an engine block 818 with mounting supports 820. The mounting supports 820 are integrally formed (e.g., a single, unitary body) with the engine block 818, or are integrally formed with a cover 822 (see, e.g., sump 310 as shown in FIGS. 3-5) for the engine block 818. For example, the mounting supports 820 may be cast from the same mold with the engine block 818. In some embodiments, the mounting supports 820 include brackets, hooks, or catches sized to fit over beams of the support frame 812. In some embodiments, the mounting supports 820 are bolted to the beams. In other embodiments, the mounting supports 820 are welded to the beams. In still other embodiments, mounting supports 820 include beams integrally formed with the engine block, and extending away from the engine block, which then connect to other beams in the frame of the lawn tractor. According to an exemplary embodiment, the mounting supports 820 extend from the engine block 818 midway up the engine block 818 or higher, lowering the center of gravity of the lawn tractor by lowering the engine 810 in the frame (compare to mounting structures 1550, 1552, 1650, 1652 as shown in FIGS. 7-8, extending from the engine block 1512 and cover 1514 at a location below the vertical middle of the engine 1510).

Figure 11:
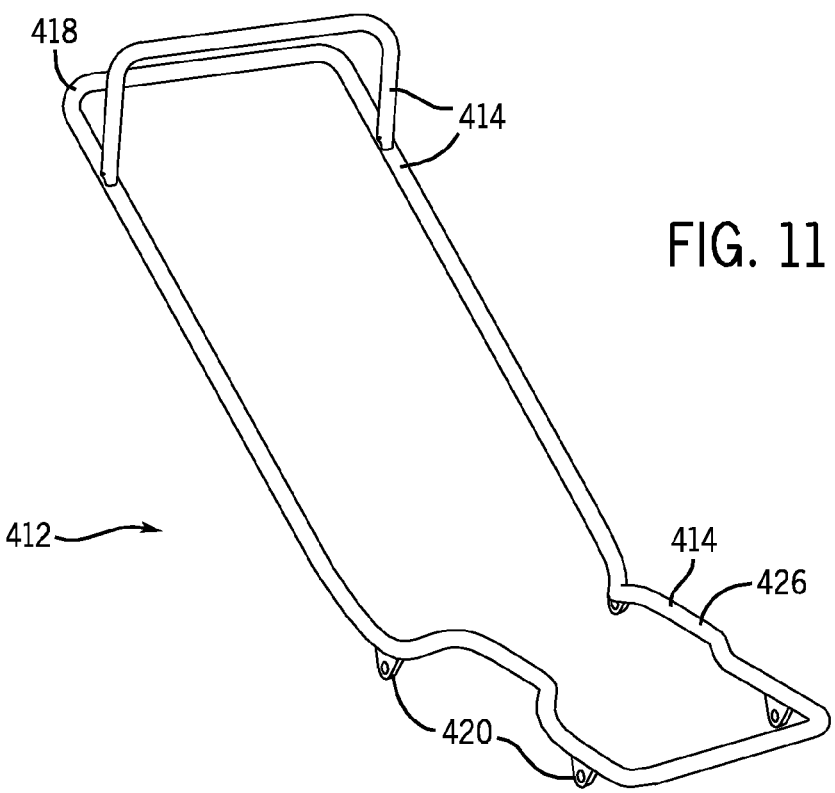
FIG. 11 is a perspective view of a frame for power equipment according to an exemplary embodiment of the invention.
Figure 12:
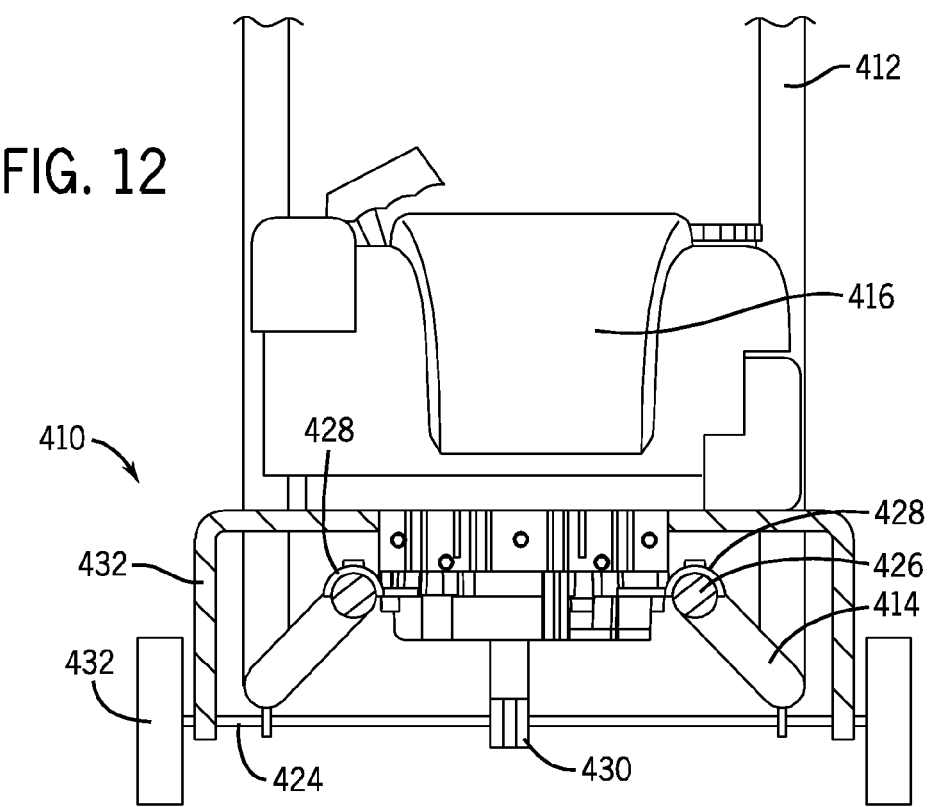
FIG. 12 is a perspective view of an item of power equipment including the frame of FIG. 11, according to an exemplary embodiment of the invention.

Referring to FIGS. 11-12, a walk-behind lawn mower 410 or other item of power equipment includes a frame 412 formed from one or more tubular members 414, and an engine 416 (FIG. 12) mounted thereto. According to an exemplary embodiment, the frame 412 includes a handle 418, bushings 420 (FIG. 11) for wheels 422 and axles 424 (FIG. 12), and portions 426 thereof configured to be coupled to mounting supports 428 that are integrally formed with the engine 416 (see generally cover 310 of FIGS. 3-5). The mounting supports 428 are contoured to match the shape of the tubular members 414 (e.g., round, arcuate, square, etc.). Between the portions 426 of the frame 412 to which the engine 416 is mounted, a power take-off 430 of the engine 416 may be coupled to a working tool, such as a lawn mower blade.

A deck 432 may then be coupled to the frame 412. However due to the structure of the mounting supports 428 and the corresponding portions 426 of the frame 412 to which the engine 416 is mounted, the deck 432 need be neither particularly load bearing, nor support the weight of the engine 416. The above described configuration may enhance performance of the lawn mower 410 (or other power tool) by lowering the center of gravity thereof, and by reducing vibrations, and associated noise, wear, and fatigue. A second deck (not shown) (e.g., plate, shield, separator) may be positioned between the engine 416 and the working tool, further separating the engine from the working tool.

Figure 13:
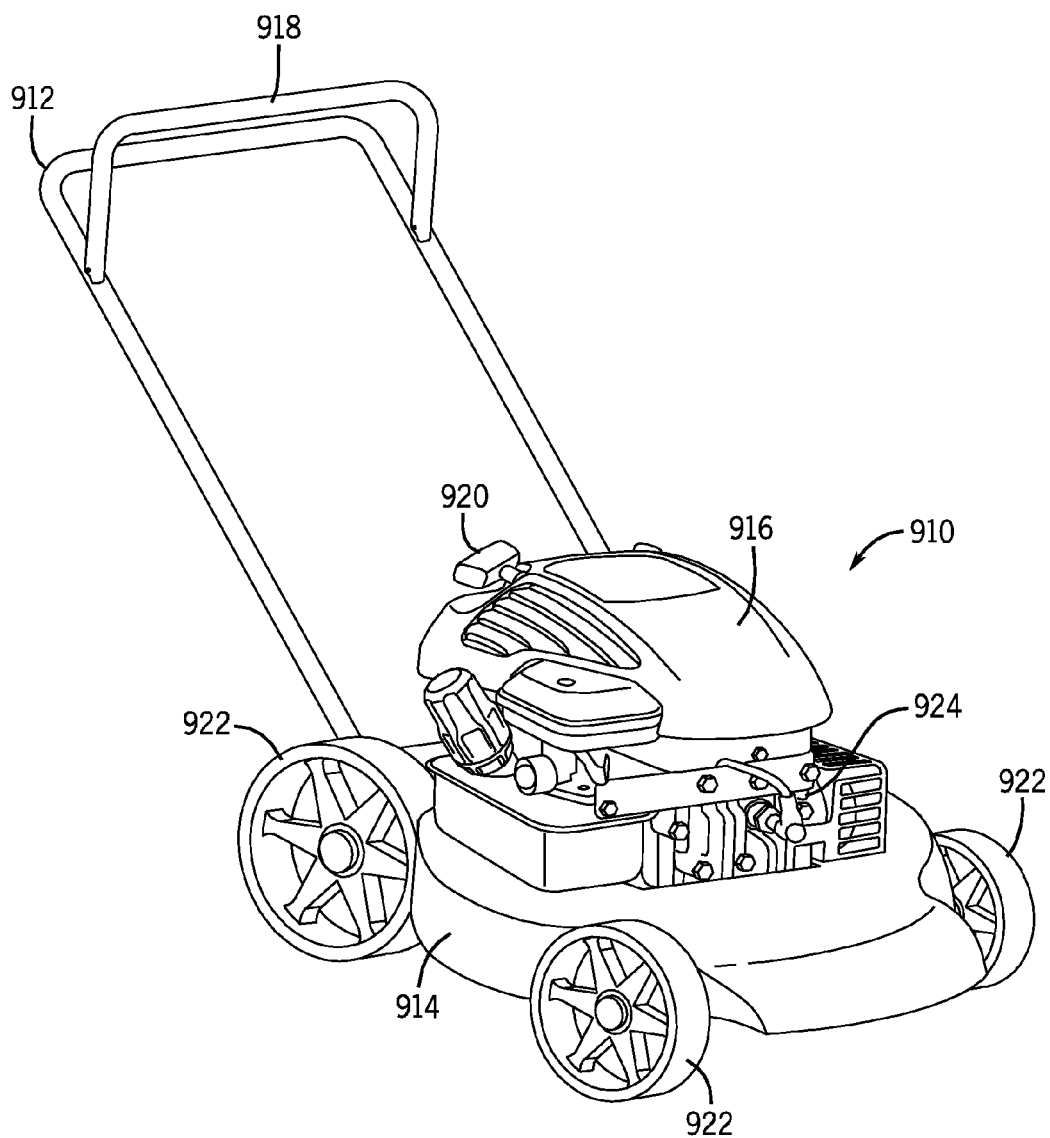
FIG. 13 is a perspective view of a rotary lawn mower according to an exemplary embodiment of the invention.

Referring to FIG. 13, a walk-behind rotary lawn mower 910 may be constructed according to the embodiment of FIGS. 11-12. In such an embodiment, the mower 910 includes a handle 912, a deck 914, and an internal combustion engine 916. In some embodiments, the internal combustion engine 916 is a single-cylinder, vertically-shafted, four cycle, gasoline- or ethanol-powered, small engine. The handle 912 is fastened to the deck 914 and includes a release bar 918 and a pull cord handle 920 coupled to a recoil starter of the engine 916. Four wheels 922 are coupled to the deck 914, allowing the rotary lawn mower 910 to be pushed via the handle 912. Other embodiments include a drive system, where the wheels 922 are driven by the engine 916. The deck 914 shields spinning mower blades and guides the flow of grass clippings during operation of the lawn mower 910. In some embodiments, a collection bag may be attached to the side or rear of the deck 914 below the handle 912, and grass clippings are passed to the collection bag through an opening in the deck 914.

Figure 14:
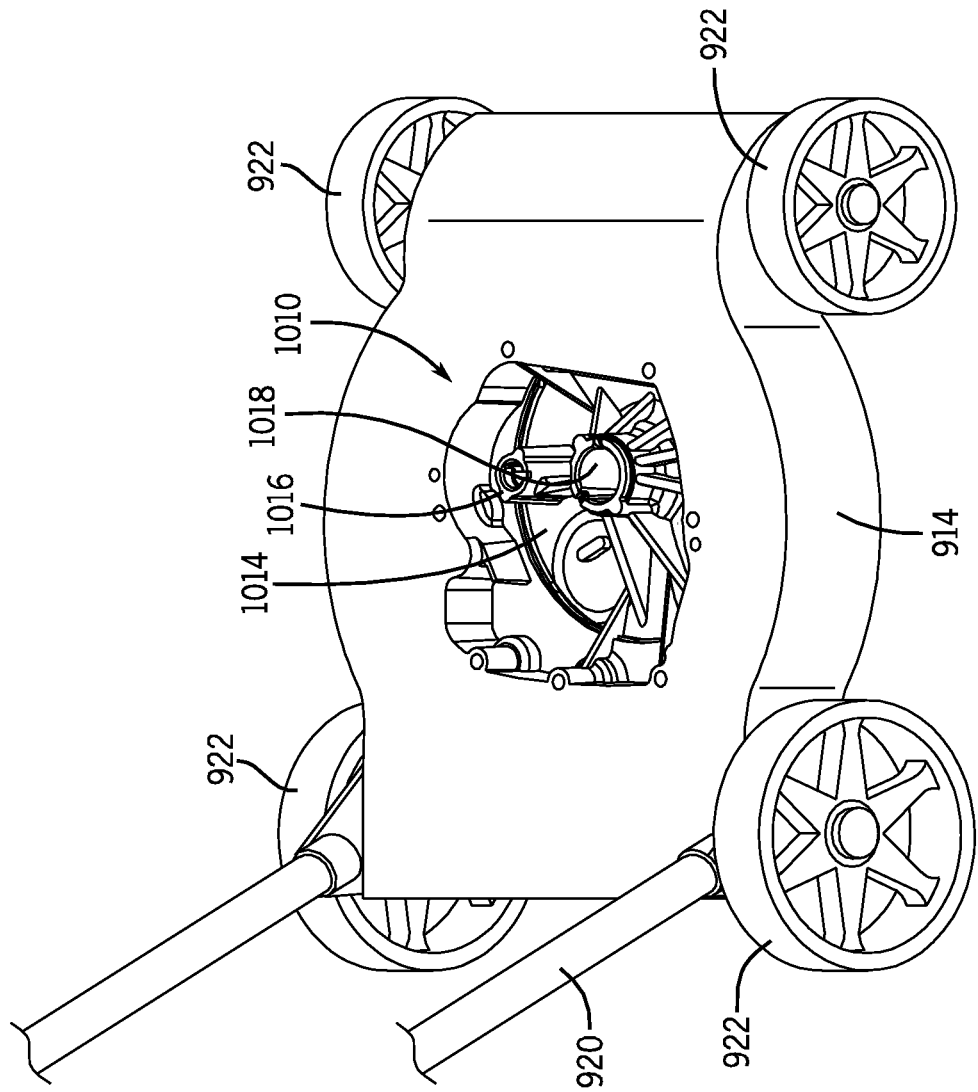
FIG. 14 is a perspective view of a mower deck of the rotary lawn mower of FIG. 13.

Alternatively, the mower 910 of FIG. 13 may be constructed according to the embodiment of FIG. 14. According to such an exemplary embodiment, a cover 1010 (see FIG. 14) of an engine block 924 (see FIG. 13) for the engine 916 is integrally formed in the deck 914 of the rotary lawn mower 910. The cover 1010 may include a sump 1014, a bearing 1016 for a cam, and a bearing 1018 for a power takeoff of a crankshaft (see, e.g., power takeoff 260 as shown in FIG. 2). The engine block 924 may be bolted directly to the deck 914, with the cover 1010 forming a wall of the engine block 924 (e.g., closing off a crankcase, inner chamber of the engine 916, etc.). Integrating the engine block 924 (i.e., and cover 1010) with the deck 914 of the lawn mower 910 may improve the vibration characteristics of the lawn mower 910, reducing noise and wearing of components. Additionally, positioning the cover 1010 of the engine block 924 within the deck 914 may also allow for a lower center of gravity of the lawn mower 910 or other powered tool. For example, in some embodiments, the oil sump 1014 of the engine 916 may be positioned below the top of the deck 914.

According to an exemplary embodiment, the deck 914 and cover 1010 for the engine block 924 (FIG. 13) are integrally formed as a single, unitary body during manufacturing of the deck 914. In some embodiments, the cover 1010 is cast with unformed portions extending away from sides of the cover 1010, where the unformed portions are subsequently stamped to form the deck 914 or a portion of the deck 914. In other embodiments, the deck 914 and the cover 1010 are stamped as a single, unitary part. In still other embodiments, the deck 914 is formed, in part, from a mounting support that is cast with and extending away from the engine block, which is then fastened to another part of the deck. For example, the mounting support may include a flat flange that forms the top of the deck (see generally mounting supports 1550, 1552 as shown in FIG. 7), where a skirt of the deck is then separately attached to the mower 910.

The construction and arrangements of the engine mounting system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, configurations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An engine mounting system, comprising:
    a tubular frame for power equipment;
    an internal combustion engine including an engine block, a crankshaft, and a crankcase cover, wherein the engine block includes a crankcase formed therein, wherein the crankshaft is positioned in the crankcase, wherein the crankcase cover includes an oil basin containing oil for distribution throughout the crankcase, and wherein the engine block has the crankcase cover attached thereto; and
    a support integrally cast with at least one of the engine block and the crankcase cover, the support extending away therefrom, wherein the support includes a contour that matches a profile of a portion of the tubular frame, and wherein the support is mounted to the tubular frame with the contour of the support engaging the profile of the portion of the tubular frame.

2. The engine mounting system of claim 1, wherein the tubular frame comprises at least one tubular beam, and wherein the at least one tubular beam has a round cross-section and the support comprises curvature configured to fit around a top portion of the at least one tubular beam.

3. The engine mounting system of claim 1, wherein the support is integrally cast with the crankcase cover.

4. The engine mounting system of claim 1, wherein the support is a first support, and wherein the engine mounting system further comprises a second support integrally cast with at least one of the engine block and the crankcase cover, the second support extending away from the at least one of the engine block and the crankcase cover.

5. The engine mounting system of claim 4, wherein the first support extends away from a first side of the engine block and the second support extends away from a second side of the engine block, and wherein the first side is opposite to the second side on an exterior of the engine block.

6. The engine mounting system of claim 1, wherein the support is bolted to the tubular frame.

7. The engine mounting system of claim 1, wherein the power equipment is at least one of a pressure washer, a rotary lawn mower, a lawn tractor, an electric generator, a log splitter, a garden tiller, a chipper, a blower, an edger, an air compressor, a snow thrower, and a water pump.

8. The engine mounting system of claim 1, further comprising:
    a pump for a pressure washer including a pump housing directly fastened to the crankcase cover and a pumping mechanism driven by a power take-off of the crankshaft;
    wherein the crankcase cover includes an opening through which the power take-off extends to the pumping.

9. The engine mounting system of claim 8, wherein the crankcase cover includes a conduit in fluid communication with the pumping mechanism.

10. The engine mounting system of claim 8, wherein the crankcase cover includes an inlet conduit in fluid communication with the pump mechanism and an outlet conduit in fluid communication with the pumping mechanism.

11. An engine mounting system for use with a tubular frame for power equipment, the engine mounting system comprising:
    an internal combustion engine including an engine block, a crankshaft, and a crankcase cover, wherein the engine block includes a crankcase formed therein, wherein the crankshaft is positioned in the crankcase, wherein the crankcase cover includes an oil basin containing oil for distribution throughout the crankcase, and wherein the engine block has the crankcase cover attached thereto; and a support integrally cast with at least one of the engine block and the crankcase cover, the support extending away therefrom, wherein the support includes a contour configured to match a profile of a portion of a tubular from for power equipment, and wherein the support is configured to be mounted to the tubular frame with the contour of the support configured to engage the profile of the portion of the tubular frame.

12. The engine mounting system of claim 11, wherein the support is integrally cast with the crankcase cover.

13. The engine mounting system of claim 11, wherein the support is a first support, and wherein the engine mounting system further comprises a second support integrally cast with at least one of the engine block and the crankcase cover, the second support extending away from the at least one of the engine block and the crankcase cover.

14. The engine mounting system of claim 13, wherein the first support extends away from a first side of the engine block and the second support extends away from a second side of the engine block, and wherein the first side is opposite to the second side on an exterior of the engine block.

15. The engine mounting system of claim 11, wherein the internal combustion engine is a vertically-shafted engine, and wherein the support is integrally formed with the crankcase cover.

16. The engine mounting system of claim 11, wherein the internal combustion engine is a horizontally-shafted engine.

17. The engine mounting system of claim 11, wherein the internal combustion engine is a vertically-shafted, single-cylinder, four-cycle, gasoline-powered engine.

18. The engine mounting system of claim 11, further comprising:

a pump for a pressure washer including a pump housing directly fastened to the crankcase cover and a pumping mechanism driven by a power take-off of the crankshaft;
wherein the crankcase cover includes an opening through which the power take-off extends to the pumping.

19. The engine mounting system of claim 18, wherein the crankcase cover includes a conduit in fluid communication with the pumping mechanism.

20. The engine mounting system of claim 18, wherein the crankcase cover includes an inlet conduit in fluid communication with the pump mechanism and an outlet conduit in fluid communication with the pumping mechanism.

\* \* \* \* \*